United States Patent
Lee et al.

(10) Patent No.: US 8,423,204 B2
(45) Date of Patent: Apr. 16, 2013

(54) ELECTRONIC DEVICE AND METHOD FOR CONTROLLING UNMANNED AERIAL VEHICLE USING THE SAME

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 301 days.

(21) Appl. No.: 12/947,832

(22) Filed: Nov. 17, 2010

(65) Prior Publication Data

US 2012/0035785 A1    Feb. 9, 2012

(30) Foreign Application Priority Data

Aug. 3, 2010 (TW) ................. 99125738 A

(51) Int. Cl.
*G05D 1/00* (2006.01)

(52) U.S. Cl.
USPC .................................................. 701/2; 701/3

(58) Field of Classification Search ............ 701/1–4; 244/189–190, 75.1, 76 R
See application file for complete search history.

(56) References Cited

U.S. PATENT DOCUMENTS

| | | | |
|---|---|---|---|
| 6,856,894 B1 * | 2/2005 | Bodin et al. | 701/2 |
| 7,286,913 B2 * | 10/2007 | Bodin et al. | 701/11 |
| 8,285,425 B2 * | 10/2012 | Morales De La Rica et al. | 701/3 |
| 2010/0250022 A1 * | 9/2010 | Hines et al. | 701/2 |

FOREIGN PATENT DOCUMENTS

| | | |
|---|---|---|
| CN | 101106660 A | 1/2008 |
| CN | 101192064 A | 6/2008 |

* cited by examiner

*Primary Examiner* — Yonel Beaulieu
(74) *Attorney, Agent, or Firm* — Altis Law Group, Inc.

(57) ABSTRACT

A method for controlling an unmanned aerial vehicle (UAV) using an electronic device obtains movement data of an object on a display screen of the electronic device, and converts the movement data of the object into control signals. The method further sends the control signals to the UAV, and changes a flight status of the UAV according to the control signals.

16 Claims, 10 Drawing Sheets

30

| Name | Directly controls | Primary effect | Used in forward flight | Used in hover flight | Movement |
|---|---|---|---|---|---|
| Cyclic (lateral) | Varies main rotor blade pitch with left and right movement | Tilts main rotor disk left and right through the swashplate | To turn the aircraft | To move sideways | FIG. 5A |
| Cyclic (longitudinal) | Varies main rotor blade pitch with fore and aft movement | Tilts main rotor disk forward and back via the swashplate | Control attitude | To move forwards/ backwards | FIG. 5B |
| Collective | Collective angle of attack for the rotor main blades via the swashplate | Increase/decrease pitch angle of all main rotor blades equally, causing the aircraft to ascend/descend | To adjust power through rotor blade pitch setting | To adjust skid height/vertical speed | FIG. 5C |
| Anti-torque pedals | Collective pitch supplied to tail rotor blades | Yaw rate | Adjust sideslip angle | Control yaw rate/ heading | FIG. 5D |

Converting table

FIG. 4

ELECTRONIC DEVICE AND METHOD FOR CONTROLLING UNMANNED AERIAL VEHICLE USING THE SAME

BACKGROUND

1. Technical Field

Embodiments of the present disclosure relate to helicopter control technology, and particularly to an electronic device and method for controlling an unmanned aerial vehicle (UAV) using the electronic device.

2. Description of Related Art

UAVs have been used to perform security surveillance by capturing images of a number of monitored scenes, and sending the captured images to a monitor computer. However, a flight status of the UAV needs to be changed using a special controller installed with the monitor computer. That is to say, if an administrator wants to change the flight status of the UAV, the administrator has to go back to the monitor computer. Accordingly, it is inefficient to control the UAV. Therefore, an efficient method for controlling the flight status of the UAV is desired.

BRIEF DESCRIPTION OF THE DRAWINGS

FIG. 4 is a schematic diagram of one embodiment of a converting table for converting the movement data of an object into different control signals.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
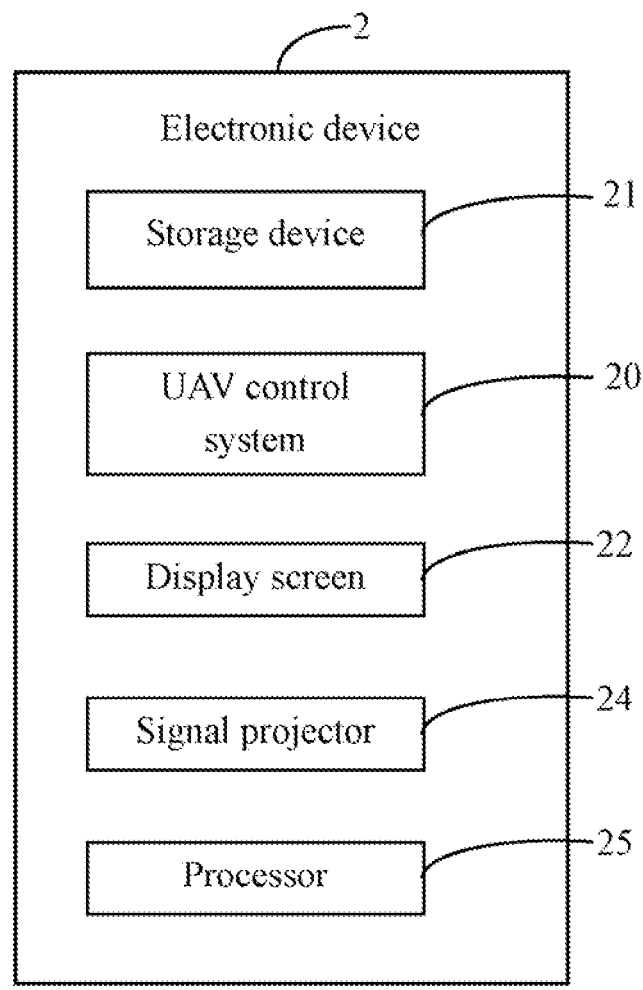
FIG. 1 is a block diagram of one embodiment of an electronic device.

FIG. 1 is a block diagram of one embodiment of an electronic device 2. In one embodiment, the electronic device 2 includes a storage device 21, an unmanned aerial vehicle (UAV) control system 20, a display screen 22, a signal projector 24, and at least one processor 25. In one embodiment, the signal projector 24 may be used to send control signals to the UAV. The UAV control system 20 may be used to obtain movement data of an object (e.g., a finger or a stylus) on the display screen 22 of the electronic device 2, and change the flight status of a UAV according to the movement data of the object. A detailed description will be given in the following paragraphs.

It may be understood that, the UAV has a signal receiver installed therein to receive control signals sent from the signal projector 24 of the electronic device 2. In one embodiment, the display screen 22 may be a liquid crystal display (LCD) or a touch-sensitive display, for example. The electronic device 2 may be a mobile phone, a personal digital assistant (PDA), or any other suitable communication device.

Figure 3:
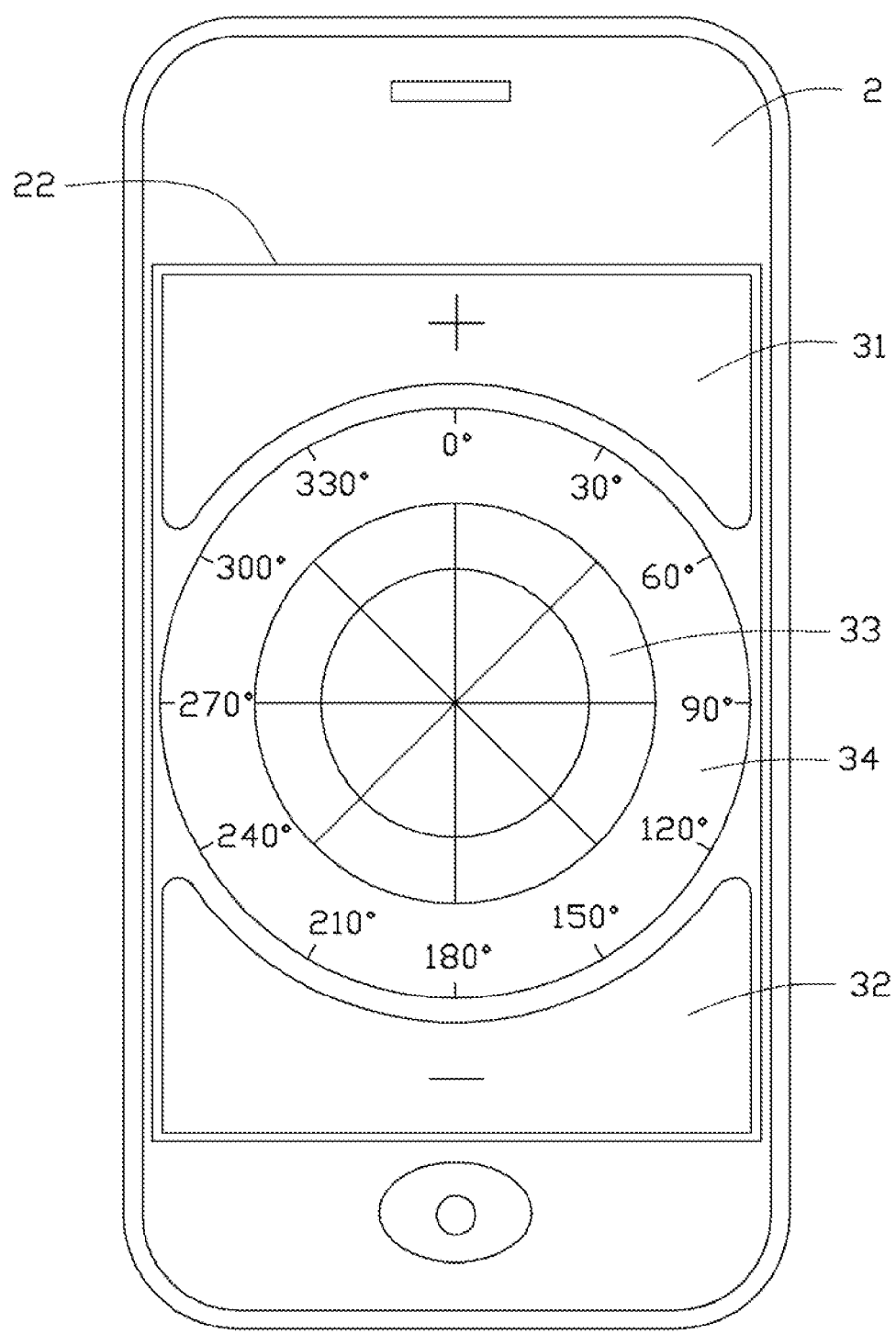
FIG. 3 is a schematic diagram of one embodiment of different blocks of a display screen of the electronic device in FIG. 1.

Referring to FIG. 3, in one embodiment, the display screen 22 may be divided into a first block 31, a second block 32, a third block 33, and a fourth block 34. The third block 33 and the fourth block 34 are located between the first block 31 and the second block 32, and the third block 33 is enclosed by the fourth block 34. In one embodiment, the third block 33 is a circle shape, and the fourth block 34 is a ring shape. The third block 33 and the fourth block 34 may be rotated according to a slide movement of the object on the display screen 22. It may be understood that the blocks 31-34 may be arranged in different locations on the display screen 22.

In one embodiment, the UAV control system 20 may include one or more modules. The one or more modules may comprise computerized code in the form of one or more programs that are stored in the storage device 21 (or memory). The computerized code includes instructions that are executed by the at least one processor 25 to provide functions for the one or more modules.

Figure 2:
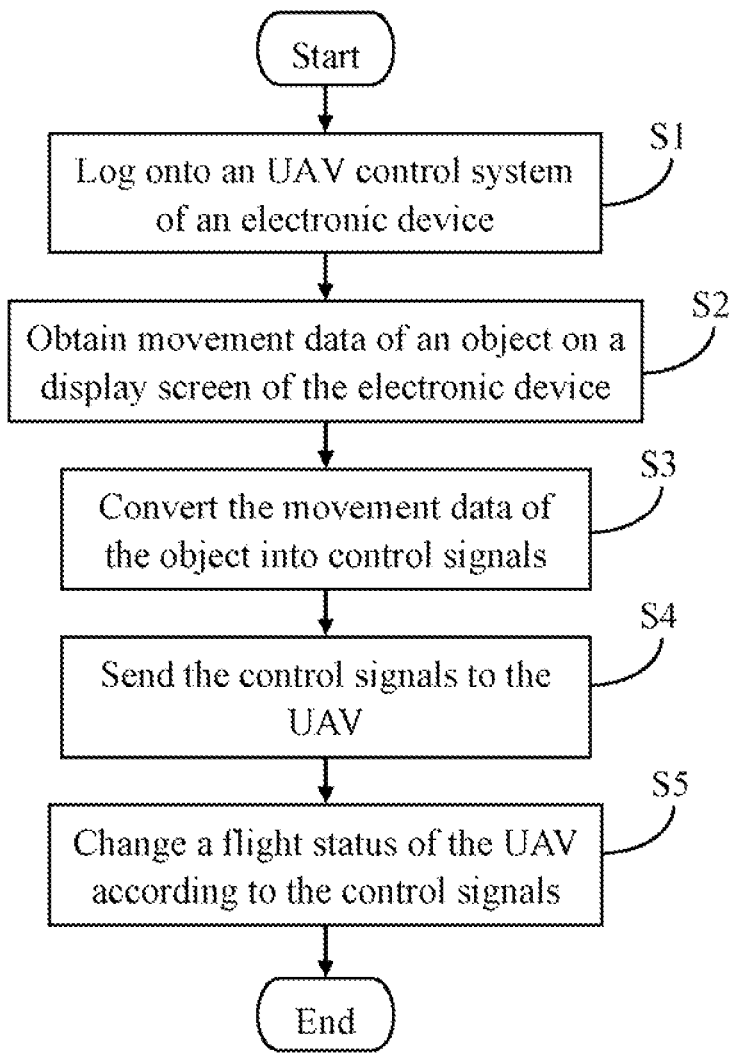
FIG. 2 is a flowchart of one embodiment of a method for controlling an unmanned aerial vehicle using the electronic device in FIG. 1.

FIG. 2 is a flowchart of one embodiment of a method for controlling the UAV using the electronic device 2 in FIG. 1. The method in FIG. 2 may be performed by the electronic device (e.g. a mobile phone) having a touch-sensitive display with a graphical user interface (GUI), at least one processor, a storage device and one or more modules, programs or sets of instructions stored in the storage device for performing the method. In one embodiment, the electronic device provides a number of functions, including wireless communication, for example. Depending on the embodiment, additional blocks may be added, others removed, and the ordering of the blocks may be changed.

In block S1, a user logs onto the UAV control system 20 on the electronic device 2. In one embodiment, the UAV includes a cyclic control, a collective pitch control, and anti-torque pedals. Detailed descriptions of primary effects of each control on the UAV are shown in FIG. 4.

In block S2, the UAV control system 20 obtains movement data of the object on the display screen 22 of the electronic device 2. In one embodiment, the movement data of the object may include a touch position of the object on the display screen 22, and a corresponding movement direction of the object. For example, the touch position may be the third block 33, and the movement direction may be left.

In block S3, the UAV control system 20 converts the movement data of the object into control signals. In one embodiment, the control signals may include, but are not limited to, a first control signal to control lateral motion of the cyclic control of the UAV, a second control signal to control longitudinal motion of the cyclic control of the UAV, a third control signal to control motion of the collective pitch control of the UAV, and a fourth control signal to control motions of the anti-torque pedals of the UAV. A converting table 30, as shown in FIG. 5, may be used to convert the movement data of the object into different control signals.

Figure 5A:
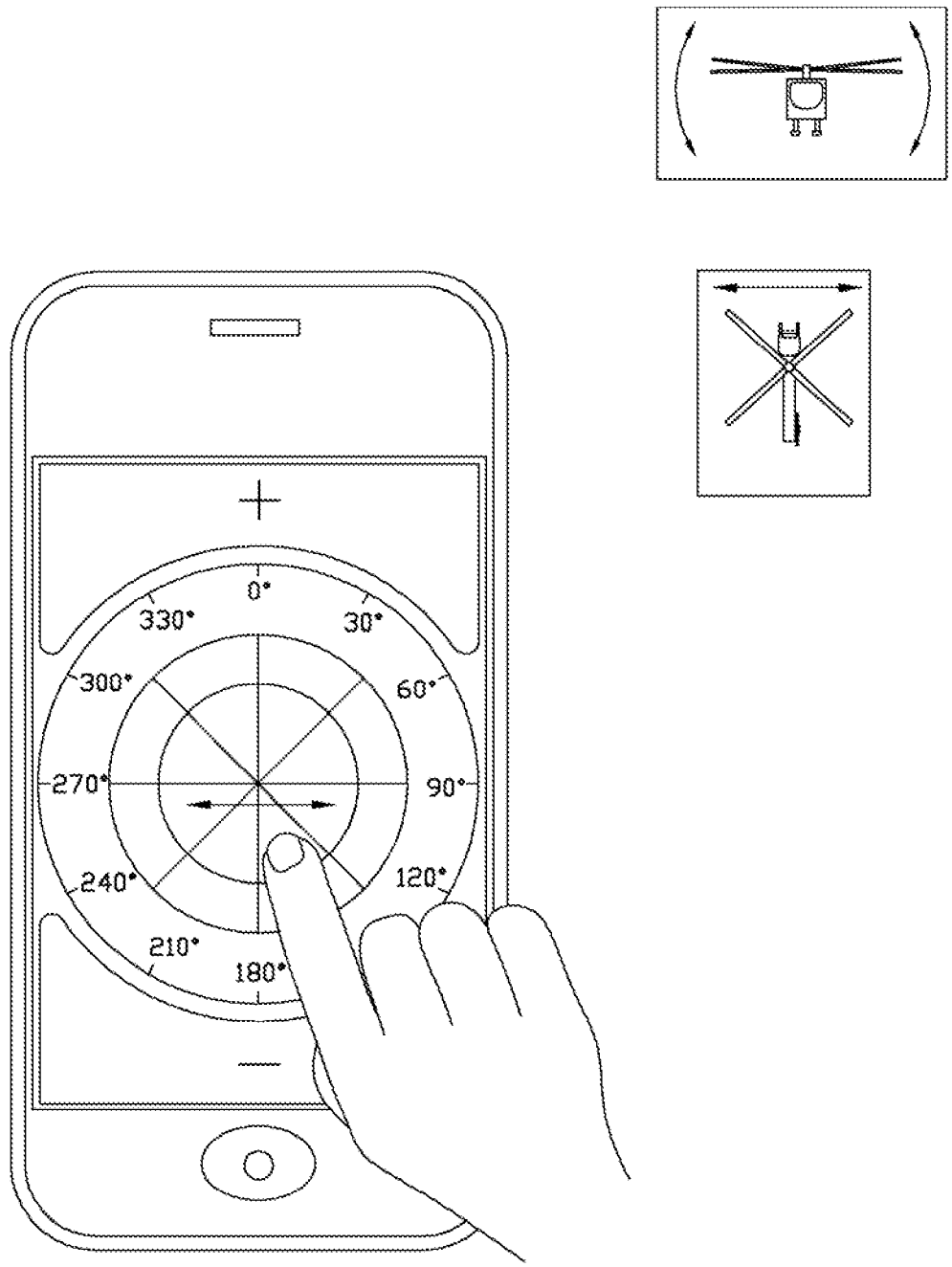
FIG. 5A is a schematic diagram of one embodiment of a movement of the object to generate a first control signal.

In one embodiment, referring to FIG. 5A, if the object moves along a horizontal direction on the third block 33, the UAV control system 20 converts the movement data of the object into the first control signal. For example, if the object moves right on the third block 33, the first control signal controls the UAV to move right.

Figure 5B:
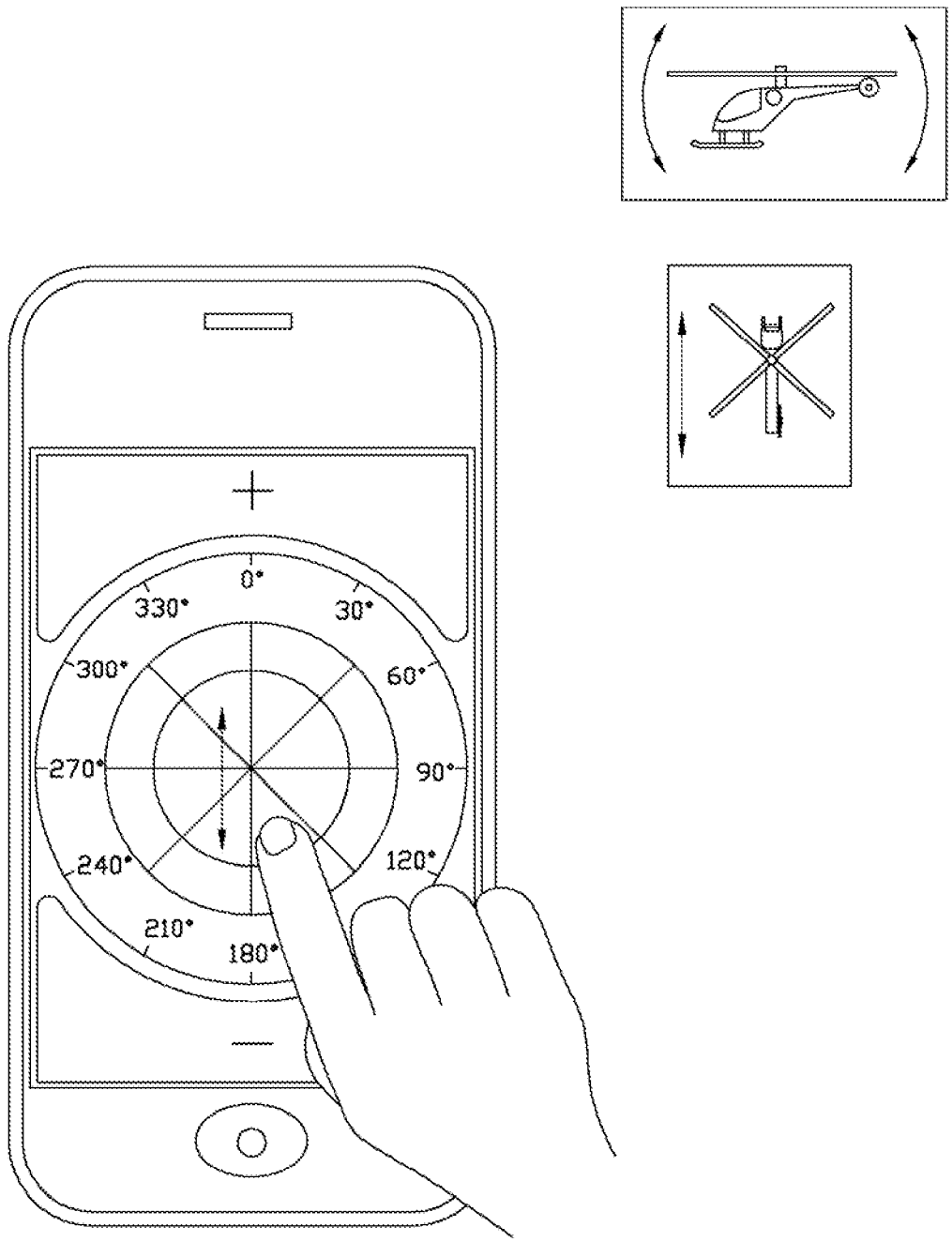
FIG. 5B is a schematic diagram of one embodiment of a movement of the object to generate a second control signal.

Referring to FIG. 5B, if the object moves along a vertical direction on the third block 33, the UAV control system 20 converts the movement data of the object into the second control signal. For example, if the object moves up on the third block 33, the first control signal control the UAV to move up.

Figure 6A:
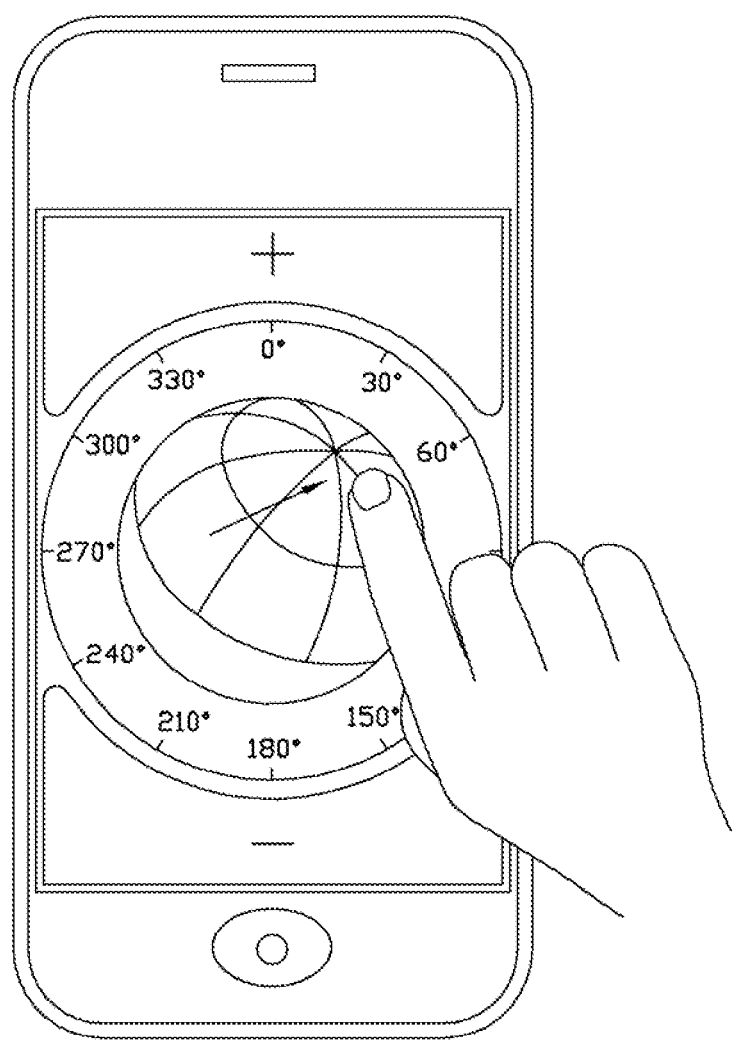
FIG. 6A is a schematic diagram of one embodiment of a movement of the object on a third block along an upper-right direction.
Figure 6B:
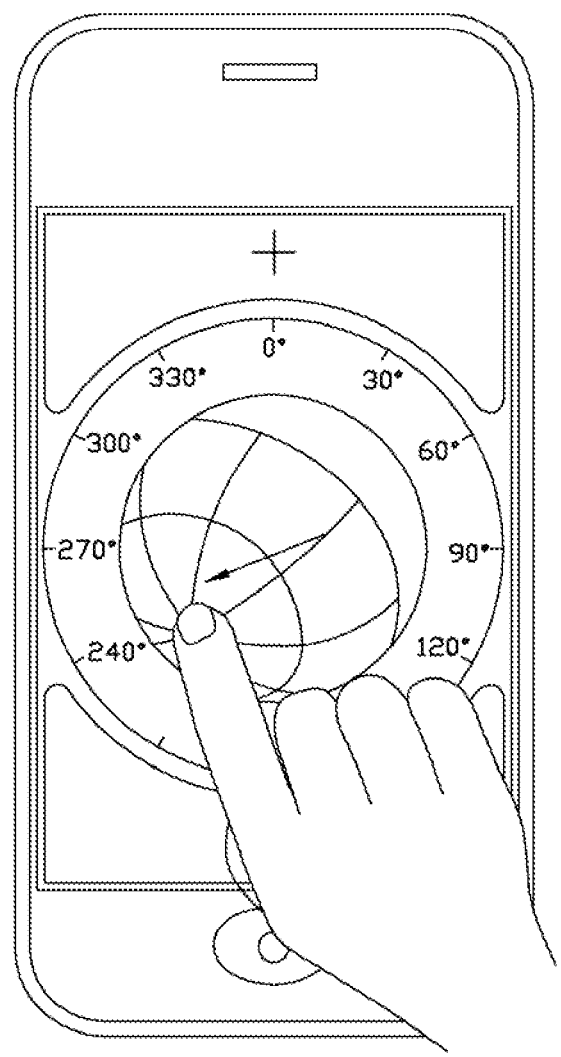
FIG. 6B is a schematic diagram of one embodiment of a movement of the object on the third block along a down-left direction.

In other embodiments, if the object moves along the horizontal direction and the vertical direction at the same time on the third block 33, the UAV control system 20 converts the movement data of the object into the first control signal and the second control signal. For example, referring to FIG. 6A, if the object moves along an upper-right direction on the third block 33, the UAV may be moved toward the upper-right direction. Referring to FIG. 6B, if the object moves along a down-left direction on the third block 33, the UAV may be moved toward the down-left direction.

Figure 5C:
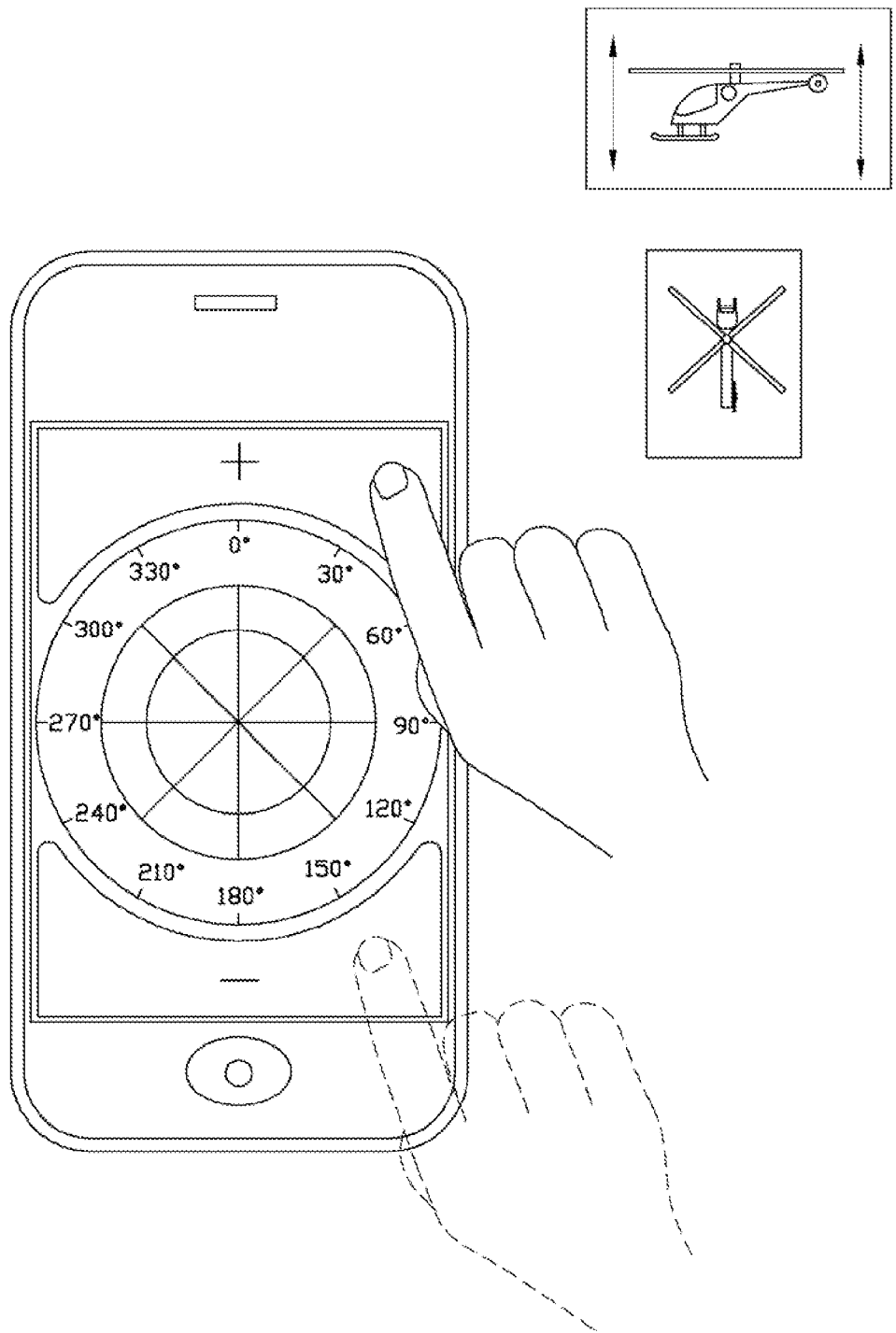
FIG. 5C is a schematic diagram of one embodiment of a movement of the object to generate a third control signal.

Referring to FIG. 5C, if the first block 31 or the second block 32 is pressed by the object, the UAV control system 20 converts the movement data of the object into the third control signal.

Figure 5D:
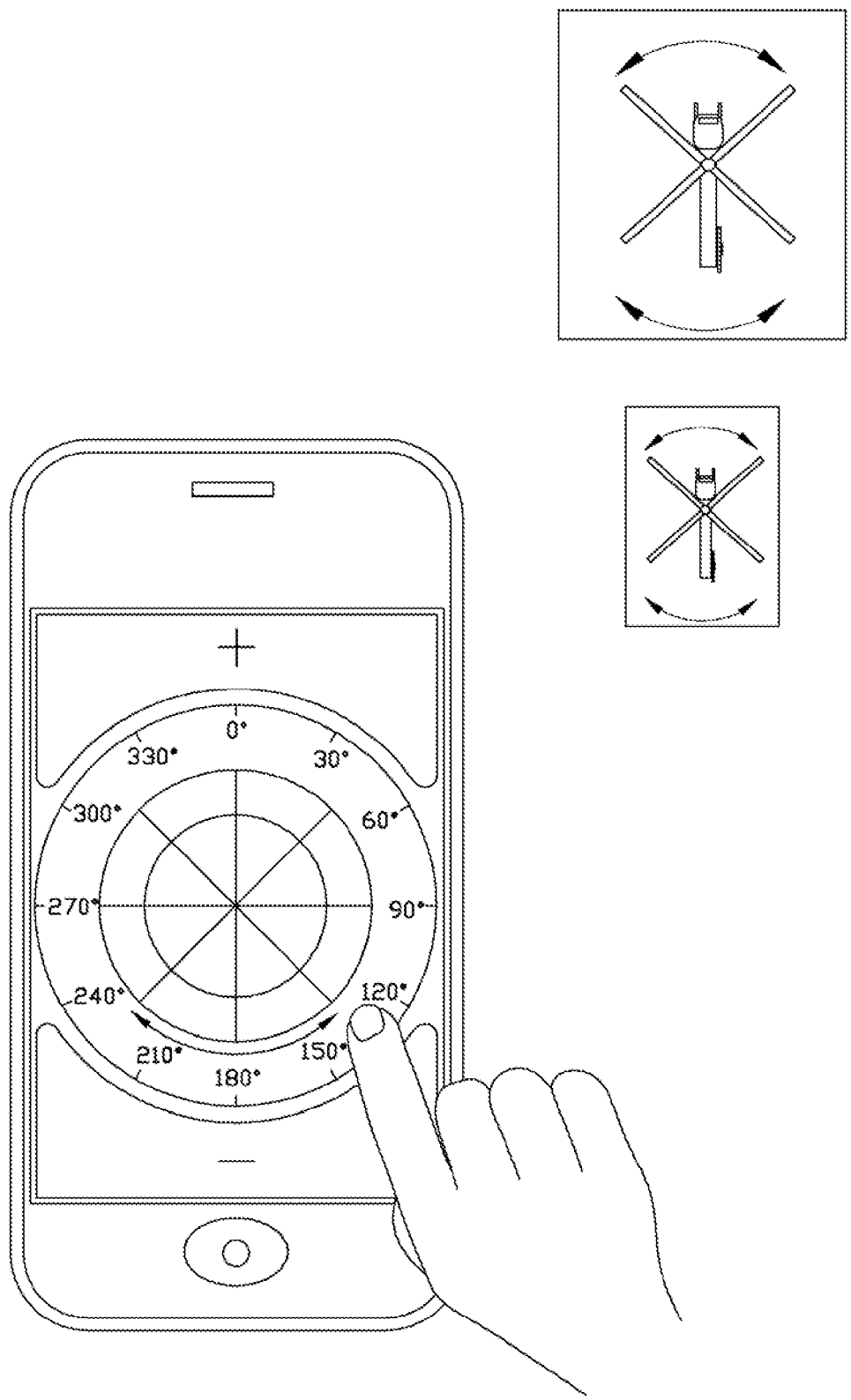
FIG. 5D is a schematic diagram of one embodiment of a movement of the object to generate a fourth control signal.

Referring to FIG. 5D, if the object moves on the fourth block 34, the UAV control system 20 converts the movement data of the object into the fourth control signal.

In block S4, the UAV control system 20 sends the control signals to the signal receiver of the UAV through the signal projector 24.

In block S5, the UAV control system 20 changes the flight status of the UAV according to the control signals. For example, if the fourth block 34 moves thirty degrees towards the left, the UAV control system 20 controls the UAV to move thirty degrees towards the left.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling an unmanned aerial vehicle (UAV) using an electronic device, comprising:
   obtaining movement data of an object on specified blocks of a display screen of the electronic device;
   converting the movement data of the object on the specified blocks of the display screen into control signals, and sending the control signals to the UAV; and
   changing a flight status of the UAV according to the control signals converted from the movement data of the object on the specified blocks of the display screen.

2. The method according to claim 1, wherein the display screen is divided into a first block, a second block, a third block, and a fourth block, the third block and the fourth block being located between the first block and the second block, the third block being enclosed by the fourth block, the third block being a circle shape, and the fourth block being a ring shape.

3. The method according to claim 1, wherein the movement data of the object comprise a touch position of the object on the display screen of the electronic device, and a corresponding movement direction of the object.

4. The method according to claim 1, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

5. The method according to claim 4, wherein the step of converting the movement data of the object into control signals comprises:
   converting the movement data of the object into the first control signal upon the condition that the object moves along a horizontal direction on the third block;
   converting the movement data of the object into the second control signal upon the condition that the object moves along a vertical direction on the third block;
   converting the movement data of the object into the third control signal upon the condition that the first block or the second block is pressed by the object; or
   converting the movement data of the object into the fourth control signal upon the condition that the object moves on the fourth block.

6. An electronic device, comprising:
   a display screen;
   a storage device;
   at least one processor; and
   one or more modules that are stored in the storage device and are executed by the at least one processor, the one or more modules comprising instructions:
   to obtain movement data of an object on specified blocks of a display screen of the electronic device;
   to convert the movement data of the object on the specified blocks of the display screen into control signals, and send the control signals to the UAV; and
   to change a flight status of the UAV according to the control signals converted from the movement data of the object on the specified blocks of the display screen.

7. The electronic device according to claim 6, wherein the display screen is divided into a first block, a second block, a third block, and a fourth block, the third block and the fourth block being located between the first block and the second block, the third block being enclosed by the fourth block, the third block being a circle shape, and the fourth block being a ring shape.

8. The electronic device according to claim 6, wherein the movement data of the object comprise a touch position of the object on the display screen of the electronic device, and a corresponding movement direction of the object.

9. The electronic device according to claim 6, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

10. The electronic device according to claim 9, wherein the instruction to convert the movement data of the object into control signals comprises:

converting the movement data of the object into the first control signal upon the condition that the object moves along a horizontal direction on the third block;

converting the movement data of the object into the second control signal upon the condition that the object moves along a vertical direction on the third block;

converting the movement data of the object into the third control signal upon the condition that the first block or the second block is pressed by the object; or converting the movement data of the object into the fourth control signal upon the condition that the object moves on the fourth block.

11. A non-transitory storage medium having stored thereon instructions that, when executed by a processor of an electronic device, causes the processor to perform a method for controlling an unmanned aerial vehicle (UAV) using the electronic device, the method comprising:

obtaining movement data of an object on specified blocks of a display screen of the electronic device;

converting the movement data of the object on the specified blocks of the display screen into control signals, and sending the control signals to the UAV; and changing a flight status of the UAV according to the control signals converted from the movement data of the object on the specified blocks of the display screen.

12. The non-transitory storage medium according to claim 11, wherein the display screen is divided into a first block, a second block, a third block, and a fourth block, the third block and the fourth block being located between the first block and the second block, the third block being enclosed by the fourth block, the third block being a circle shape, and the fourth block being a ring shape.

13. The non-transitory storage medium according to claim 11, wherein the movement data of the object comprise a touch position of the object on the display screen of the electronic device, and a corresponding movement direction of the object.

14. The non-transitory storage medium according to claim 11, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

15. The non-transitory storage medium according to claim 14, wherein the step of converting the movement data of the object into control signals comprises:

converting the movement data of the object into the first control signal upon the condition that the object moves along a horizontal direction on the third block;

converting the movement data of the object into the second control signal upon the condition that the object moves along a vertical direction on the third block;

converting the movement data of the object into the third control signal upon the condition that the first block or the second block is pressed by the object; or converting the movement data of the object into the fourth control signal upon the condition that the object moves on the fourth block.

16. The non-transitory storage medium according to claim 11, wherein the medium is selected from the group consisting of a hard disk drive, a compact disc, a digital video disc, and a tape drive.

* * * * *